F. A. HART.
COMBINED TYPE WRITING AND COMPUTING MACHINE.
APPLICATION FILED MAR. 17, 1911.

1,231,523. Patented June 26, 1917.
6 SHEETS—SHEET 1.

F. A. HART.
COMBINED TYPE WRITING AND COMPUTING MACHINE.
APPLICATION FILED MAR. 17, 1911.
1,231,523.
Patented June 26, 1917.
6 SHEETS—SHEET 2.
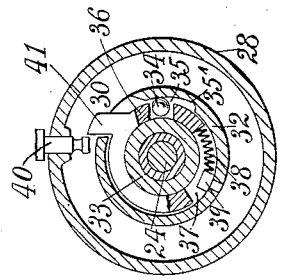
FIG. 2<sup>A</sup>.
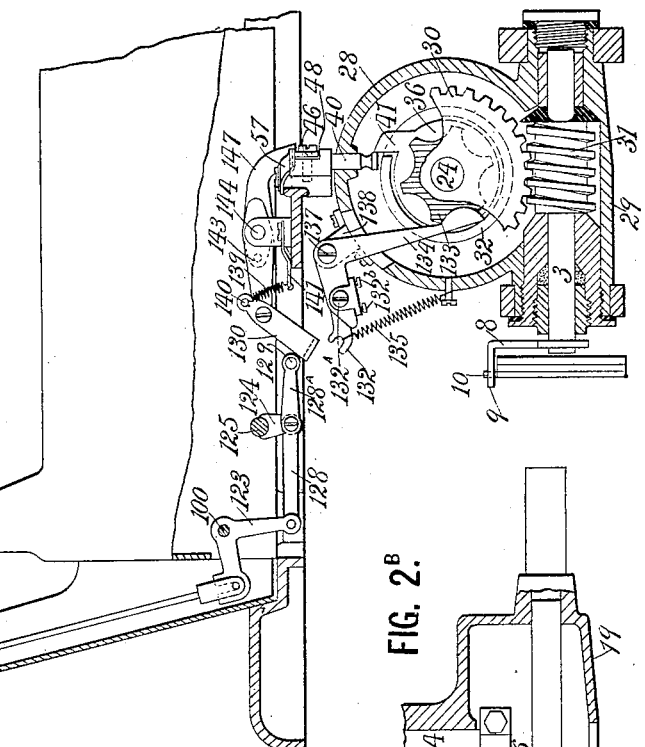
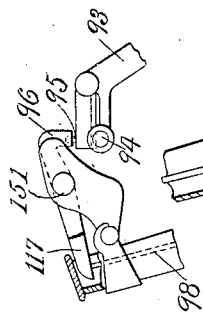
FIG. 2.
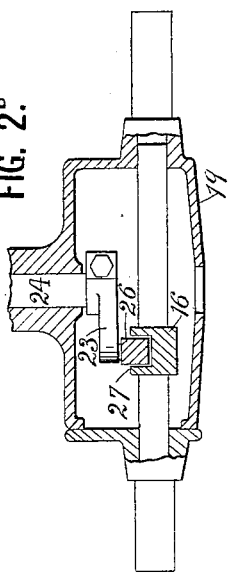
FIG. 2<sup>B</sup>.
Witnesses
J. A. Brophy
J. A. Rennie
Inventor
Frederick A. Hart
BY
D. C. Stickney
Attorney F. A. HART.
COMBINED TYPE WRITING AND COMPUTING MACHINE.
APPLICATION FILED MAR. 17, 1911.

1,231,523.

Patented June 26, 1917.
6 SHEETS—SHEET 3.

Witnesses
J. A. Brophy
J. A. Rennie

Inventor
Frederick A. Hart
BY
B. B. Stickney
Attorney

F. A. HART.
COMBINED TYPE WRITING AND COMPUTING MACHINE.
APPLICATION FILED MAR. 17, 1911.

1,231,523.

Patented June 26, 1917.
6 SHEETS—SHEET 4.

Witnesses
J. A. Brophy
J. A. Rennie

Inventor
Frederick A. Hart
BY B. B. Stickney
Attorney

F. A. HART.
COMBINED TYPE WRITING AND COMPUTING MACHINE.
APPLICATION FILED MAR. 17, 1911.

1,231,523. Patented June 26, 1917.
6 SHEETS—SHEET 5.

Witnesses
J. A. Brophy.
J. A. Rennie

Inventor
Frederick A. Hart
BY
R. C. Stickney
Attorney

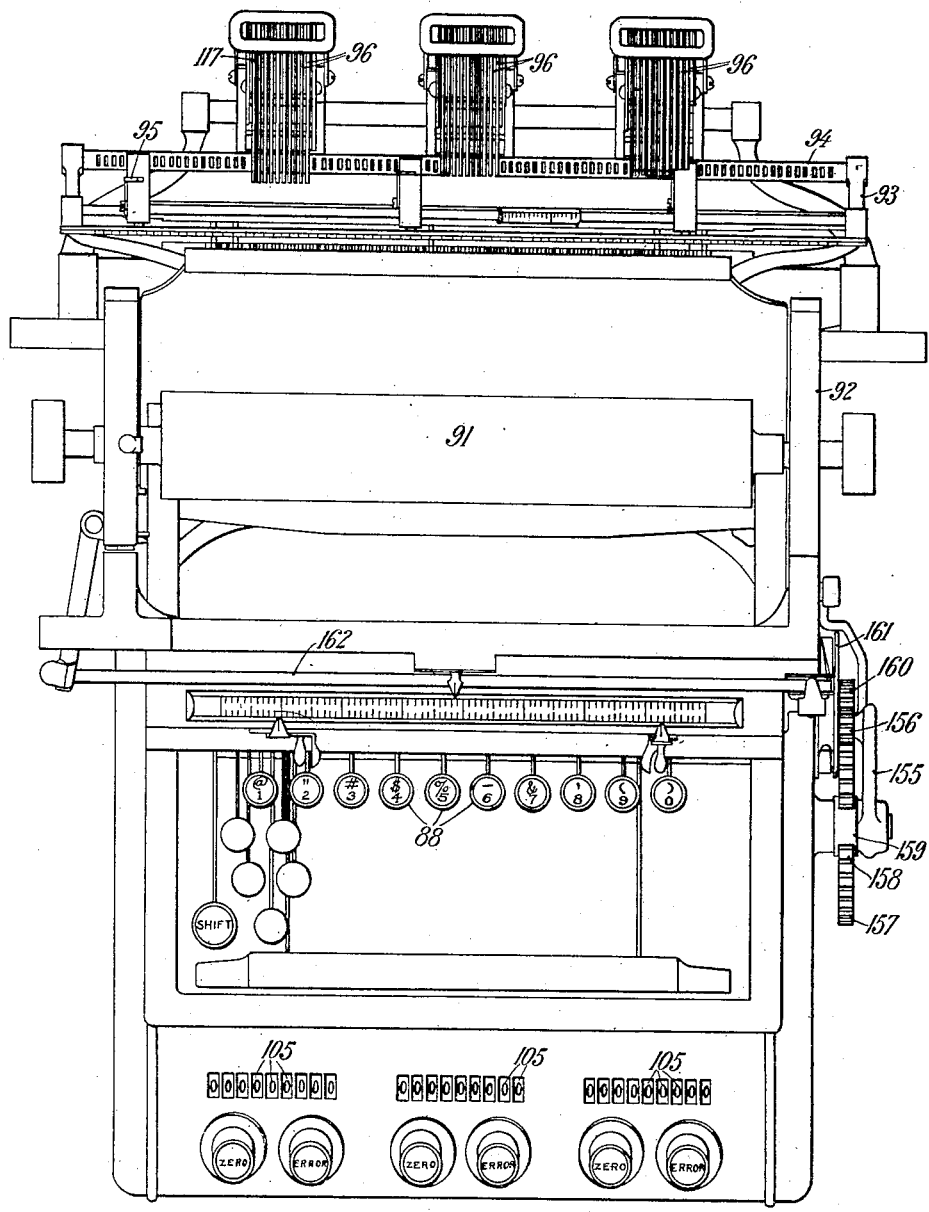

UNITED STATES PATENT OFFICE.

FREDERICK A. HART, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,231,523.　　　　Specification of Letters Patent.　　Patented June 26, 1917.

Application filed March 17, 1911. Serial No. 614,993.

*To all whom it may concern:*

Be it known that I, FREDERICK A. HART, a citizen of the United States, residing in Hartford, in the county of Hartford and State of Connecticut, have invented certain new and useful Improvements in Combined Type-Writing and Computing Machines, of which the following is a specification.

This invention relates generally to that class of combined typewriting and computing machines illustrated and described in my application No. 466,836, filed December 10, 1908, and also in the British Patent No. 3390 of 1912.

According to the disclosure in said application and patent, the general operator of the computing mechanism when actuated also controls the return of the typewriter carriage.

According to the present improvements, I employ a motor for operating the general operator and returning the carriage, and so arrange the parts that upon the writing of any figure in the units place in a column, the carriage is connected to the motor and at the same time the general operator is given a stroke, so that the return movement of the carriage takes place at the same time that the computing wheels are being rotated.

The present improvements may be carried out in a machine having either a single computing head or a plurality of computing heads, and in the latter case adjustable devices may be set to provide for the operation of the computing mechanism and return of the carriage only at the writing of a character in the units place in the last column on the work sheet.

Other features and advantages will hereinafter appear.

In the accompanying drawings,

Figure 1 is a part-sectional side elevation of an Underwood typewriter combined with a computing machine of the Hanson type, and showing the present improvements applied thereto; the parts being in normal positions, and certain devices being omitted for the sake of clearness.

Fig. 1ᵃ is a plan of certain portions of the carriage-returning mechanism including an adjustable device for controlling the same.

Fig. 1ᵇ is a sectional elevation of the devices seen at Fig. 1ᵃ.

Fig. 2 is a sectional elevation showing particularly the connections for closing the clutch between the constantly running motor and the general operator of the computing mechanism; said clutch being shown open.

Fig. 2ᵃ is a sectional view to illustrate the details of the clutch mechanism; the clutch being open.

Fig. 2ᵇ is a sectional plan, showing the connection between a motor-driven rotary device and a part of the reciprocating general operator of the computing machine.

Fig. 11 is a top plan view, showing a plurality of registers.

Figure 1:
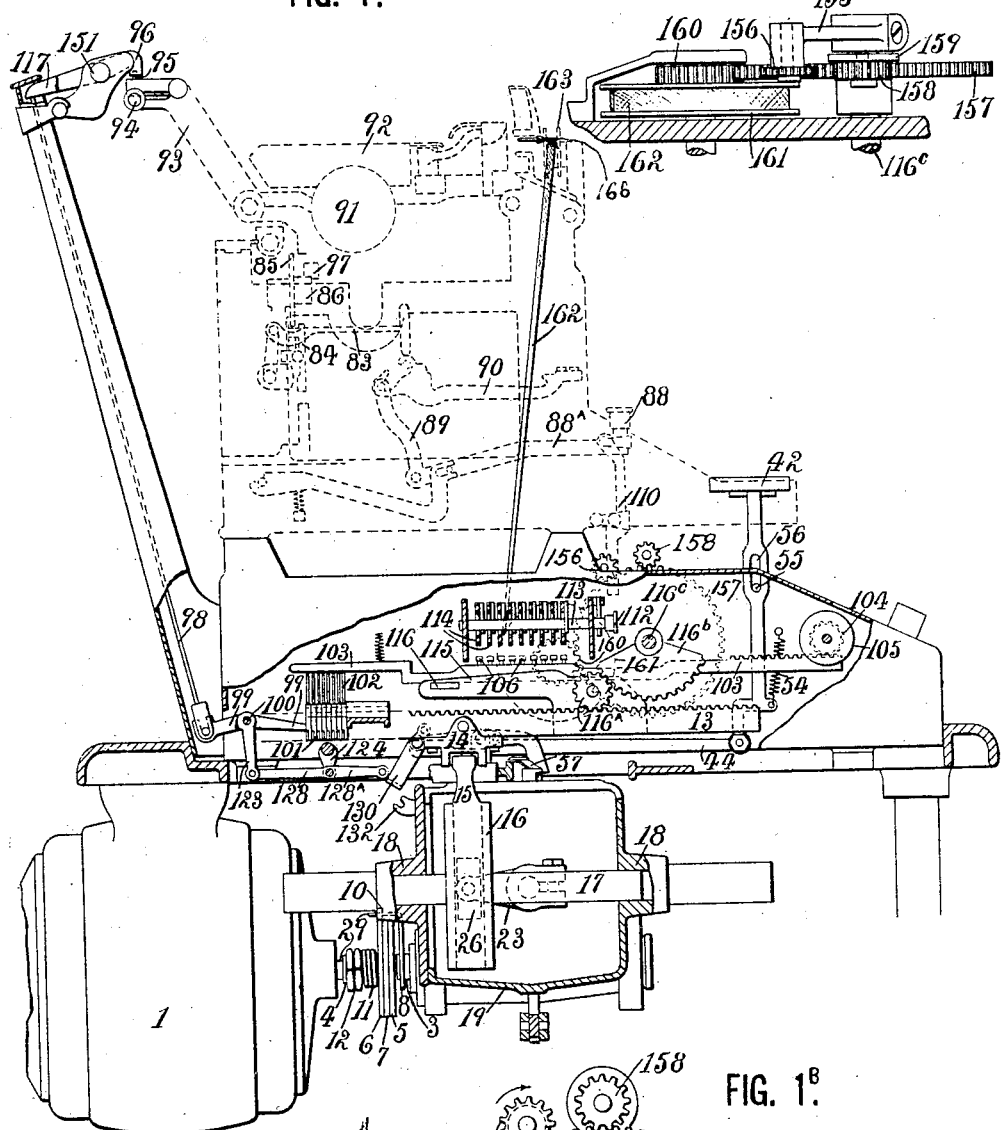
Figure 3:
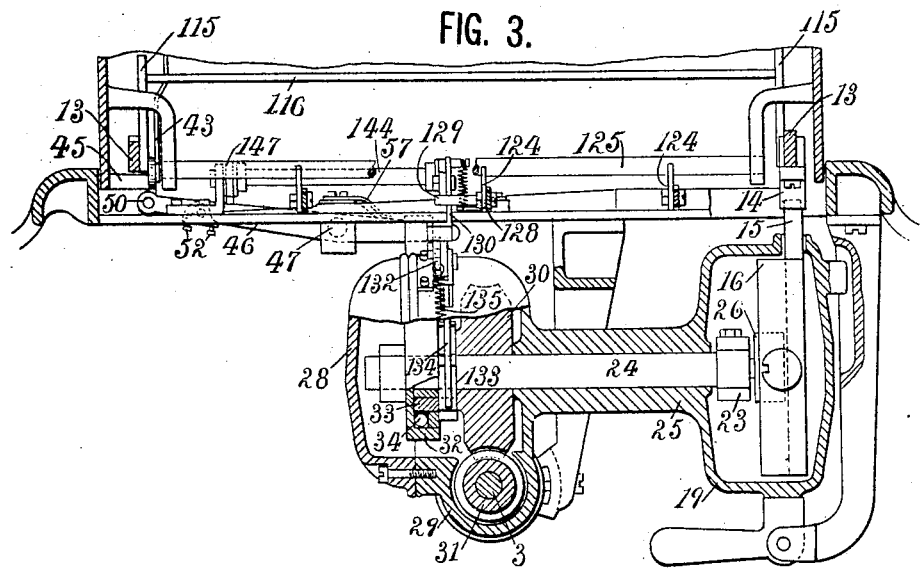
Fig. 3 is a sectional view, showing the motor mechanism and its connections. This view is taken across the base of the computing machine.

A continuously running electric or other motor 1 is provided with a main shaft 2, the latter connected to a shaft 3 by means of a safety friction clutch. This clutch may comprise a disk 5 having a hub 4 keyed to the shaft 2, a friction disk 6 being loose on said hub; another friction disk 7 being confined between disks 5 and 6. An arm 8 fast on shaft 3 is bent over at 9 to be engaged and driven by a lug 10 on disk 6. A compression spring 11 is coiled around the hub 4, and adjusted by a nut 12 to determine how much of a load the clutch will carry without slipping.

A rack 13, forming part of a rack frame, is movable forwardly and backwardly in the base of the adding machine, and performs the final portion of the computing operation. This rack frame is reciprocated intermittently by the constantly rotating shaft 3, by means of a clutch mechanism; said rack frame being connected to a crank shaft to be driven thereby, and the crank shaft being connected by a worm gearing to said shaft 3, as will presently be set forth.

Upon the rack frame is secured a yoke or carrier 14, in engagement with which is the upper end of an arm 15, provided on a cross head 16, which moves forwardly and backwardly, or from left to right at Fig. 1, so as to reciprocate said rack frame 13; said cross head being carried on a horizontal slide 17, which works in bearings 18 on a casing 19. This slide is reciprocated by means of a crank 23, fixed on a horizontal shaft 24; said crank carrying a slide block 26, working in a groove 27 in the cross head.

Loose on shaft 24 is a worm gear 30, meshing with a worm 31, the latter fixed on shaft 3, so that the worm wheel 30 is constantly rotating.

The worm wheel 30 is connectible to shaft 24 to turn the same whenever it is necessary to reciprocate the rack frame 13 to complete a computing operation; and at the conclusion of said reciprocation, said worm wheel 30 is automatically disconnected from the shaft 24, and the latter comes to a stop, while the motor 1 continues to rotate.

Fixed to shaft 24 is a cup member 32 of a clutch; and fixed to the hub of worm gear 30 is a collar 33. Running on this collar and adapted to engage the inside of a cylindrical face of the clutch cup 32, is a gripping ball or roll 34; said roll occupying a pocket 35 in the clutch cup, and rolling on an inclined floor 35$^a$ thereof, so that relative movement between the clutch cup and collar 33 in one direction will cause said members to be clutched together by the roll, while relative movement in the opposite direction will produce the opposite effect, so as to permit independent rotation of the gear 30.

The clutch roll is shiftable between gripping and releasing positions in the pocket 35 by means of a ring or disk 36, which rides loosely on the collar 33 within cup 32, and which is cut away at one place to receive the roll 34, so as to engage the roll on both sides thereof. Rotation of ring 36, therefore, shifts the roll. Against said disk 36 bears one end of a compression spring 38, which is confined within a pocket 37 formed in said disk; the other end of said spring bearing against a stop 39 secured to the inner side of the clutch cup. The pocket 37 is of sufficient length to permit a movement of the disk or ring 36 without interference from the stop 39. The spring tends to turn the disk 36 with the roll 34 in a direction to lock together the clutch cup with the bearing collar to cause shaft 24 to rotate with gear 30. In other words, said spring tends normally to close the clutch. Normally, however, said disk 36 is restrained from causing the roll to bind; or in other words, said disk is normally held in clutch-releasing position.

For this purpose, there is provided a pin or latch 40, normally in engagement with a lug 41 provided upon releasing disk 36, said lug projecting through an opening in the clutch cup. When shaft 24 is to be clutched to the gear 30, the latch 40 is raised to release lug 41, whereupon spring 38 throws disk 36, together with roll 34, thus locking the clutch cup and the shaft 24 to the rotating worm gear 30. The pin 40 is automatically dropped again into the path of lug 41, so that at the completion of a single revolution of the shaft 24, the latter is again unclutched from the worm gear 30.

The rack frame 13 is caused to reciprocate after the numeral keys of the typewriter have been operated to set up a number. This rack frame operates to turn the computing wheels to different extents, depending upon the key operated. It is necessary, therefore, in some cases, for the described clutch to operate after each number is written on the typewriter; and while the present improvement relates particularly to means for securing such operation automatically, or without attention on the part of the operator, still I will first describe means whereby the operator may depress a special key to operate said clutch, and cause the reciprocation of the rack frame. Said key is designated as 42, and is mounted on a stem 43, pivoted at its lower end to a lever 44, fulcrumed at 45 upon the machine frame. Said lever 44, in turn, depresses a cross lever 46, which is pivoted at 47 to the framework, and at its other end engages a notch 48 formed in the top of the trip pin or latch 40, so as to cause or control the up and down movement of said latch, whereby the clutch is caused to open and close. The lever 46 is provided with an adjustable end or arm 50, upon which the key lever 42 bears; this part 50 being adjustable by screws 52, thereby securing accuracy of adjustment and movement of the clutch-controlling mechanism.

Depression of the key 42 carries down the lever 44, the latter rocks the lever 46 about its fulcrum 47, the other end of the lever lifting the latch 40 away from the clutch lug 41. The operator immediately releases the key 42, which is returned to normal position by a spring 54. The movement of the key is limited by a pin 55 within a slot 56 in the key stem. The lever 46 has a returning spring 57.

The typewriter includes the usual set of type-operating keys, including alphabet keys and also including numeral keys 88 mounted on levers 88ª and connected by bell cranks 89 to type bars 90, which are thrown back against a platen 91 mounted on a carriage 92. The carriage is power-driven, as usual, and has a rack 97 meshing with a pinion 86, connected with an escapement wheel 85, the latter controlled by dogs 84, operated by a universal bar 83, which is actuated by the type bars, so that whenever any type key is actuated, the carriage 92 is caused to feed a letter space.

Fastened at the back of the carriage 92, are brackets 93, carrying a rack 94, to receive adjustable cams or tappets 95. Whenever any tappet, during the travel of the carriage, passes beneath the set of jacks 96, it raises the forward ends of the jacks in succession, turning each on its pivot 97, and depressing its rear end to press down the corresponding one of a set of wires 98. These wires are connected at their lower ends to levers 99 on a fulcrum rod 100.

Each lever 99 raises one of a set of linkages 101, each linkage having a pin 102 to lift the rear end of a rack 103, the forward end of which meshes with a pinion 104 connected to a computing wheel 105. Each rack carries a set of pins 106, and one of these is depressed by the operated type key 88; each key having a stem 110, for this purpose, to depress a crank 112, fast to a shaft 113, which is connected to a linkage 114, to depress one of the pins 106 upon the lifted rack bar 103; there being one linkage 114 for each key, each linkage being in position to depress a corresponding pin 106 on whichever rack bar is lifted. Thus it will be seen that the pins on the rack bar 103 form in effect a register on which items are registered prior to being carried into the computing wheels. After the keys 88 are manipulated to write a number, and the corresponding racks 103 accordingly elevated as the paper-carriage feeds along, and certain pins 106 thereon depressed, there must be caused a reciprocation of the rack frame 13. This frame usually includes a pair of arms 115 connected by a transverse horizontal bar 116, which is in position to engage all the displaced pins 106, and to give corresponding forward endwise movements to their racks 103, thereby turning the computing wheels 105 accordingly; the return movements of the racks not turning said wheels, however, because of a pawl-and-ratchet connection (not shown) between said wheels and their drive pinions 104. Pinions 116ª meshing with racks 13, are also in mesh with segments 116ᵇ fixed on rock-shaft 116ᶜ.

This computation movement of the rack frame or so-called "general operator" 13 is secured automatically, at the completion of the writing of a number; that is, without the necessity of depressing the key 42, and without the necessity of the operator keeping the matter in mind.

For this purpose, at the left-hand end of each group of jacks 96 is placed a supernumerary jack 117, connected by wire 98 to a bell crank 123, pivoted on shaft 100 at the left-hand end of the gang of levers 99. The bell cranks 123 are connected by links 128 to arms 124, depending from a horizontal transverse rock shaft 125. The middle link 128 has a forward extension 128ª, carrying a pin 129, which at the movement of any of the bell cranks 123, is thrust forwardly against a link 130, the latter pivoted near its upper end on an arm 143, for the purpose of vibrating the latter.

This link 130 is normally idle, but is capable of swinging to position to form an interponent or movement-transmitter between said arm 143 and an arm 132, which latter is power-driven and constantly vibrates up and down, so that said arm 143 is vibrated, together with rock shaft 144 on which it is fixed, and an arm 147 on said shaft 144 swings down to operate the lever 46, which it will be remembered, lifts the clutch latch 40 so that the shaft 24 becomes clutched to the gear 30, and hence the rack frame or operator 13 is caused to reciprocate.

The arm 132 is kept in constant vibration by means of a follower 134, the lower end whereof is pressed by a spring 135 against a wheel 133, which is in the nature of a star wheel or cam wheel, consisting of a succession of depressions and elevations. This wheel 133 is fixed to the worm gear 30, and hence the arm 132 is constantly vibrated up and down while the motor 1 is in operation. The arm 132 is adjustably connected to the follower 134 by means of a pivot 132ª and adjusting screws 132ᵇ, as seen at Fig. 4.

Figure 4:
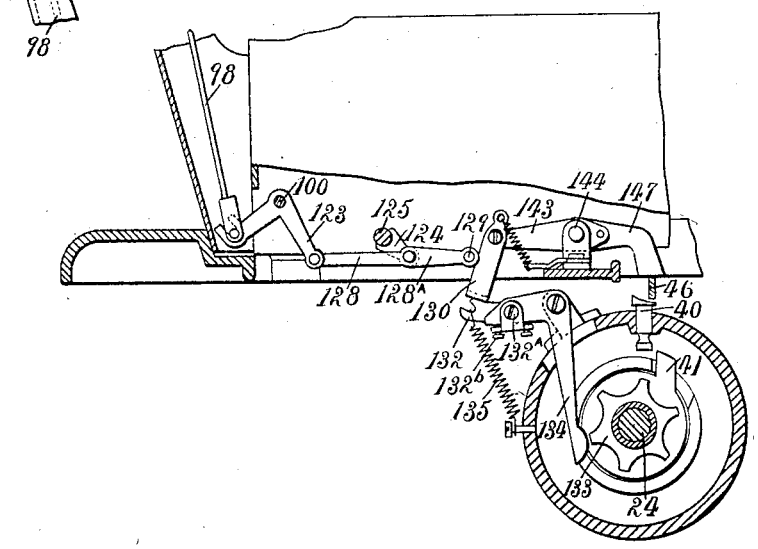
Fig. 4 is a view similar to Fig. 2, but showing the method of closing the clutch.
Figure 5:
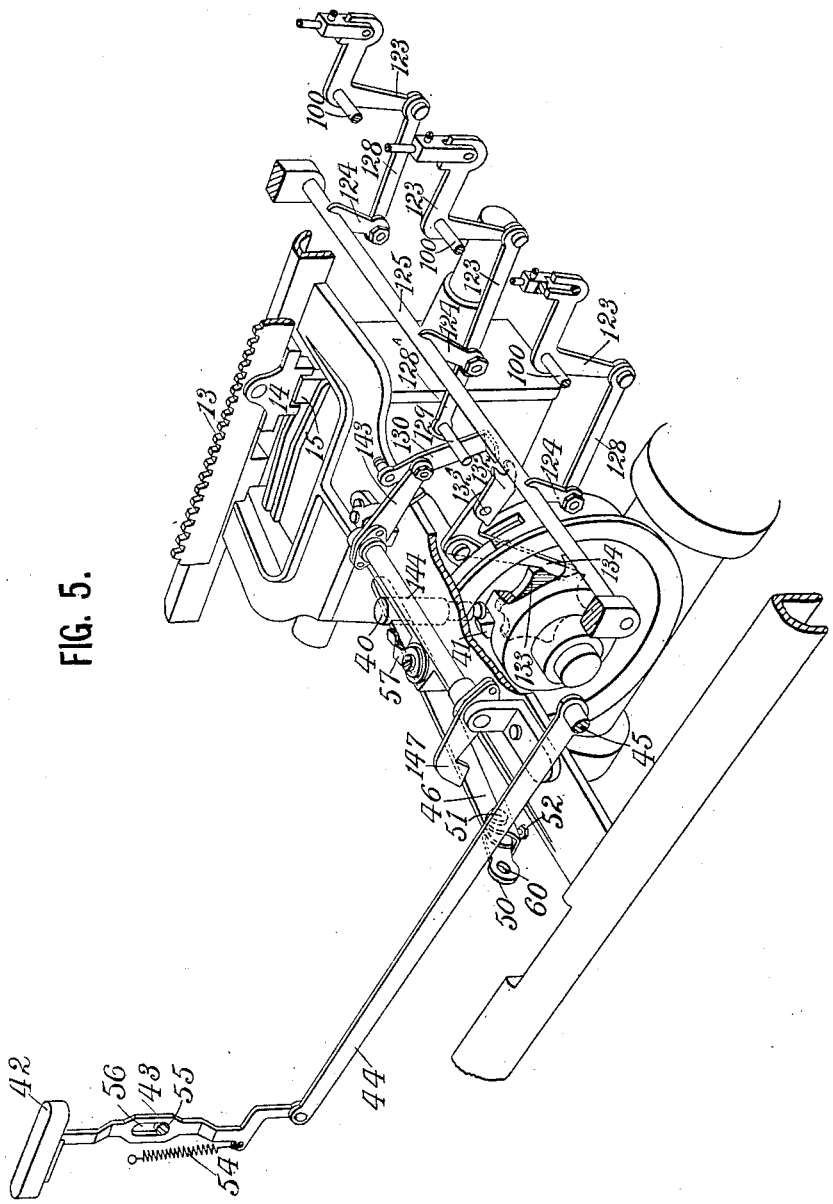
Fig. 5 is a perspective rear view of the lower part of the computing mechanism, showing particularly the means for automatically closing the clutch between the motor and the general operator of the machine.

It will be understood that when the pin 129 thrusts forward the interponent 130, the latter is swung to position over the arm 132, as seen at Fig. 4, and the latter, when rising, thrusts up the interponent 130, and swings arms 143 and 147, and trips the clutch, as already explained; so that the computing operation is completed automatically as the paper carriage 92 of the typewriter completes the letter-spacing operation which is occasioned by the return to normal position of the type-operating numeral key 88 which was employed to write in the units place.

Figure 6:
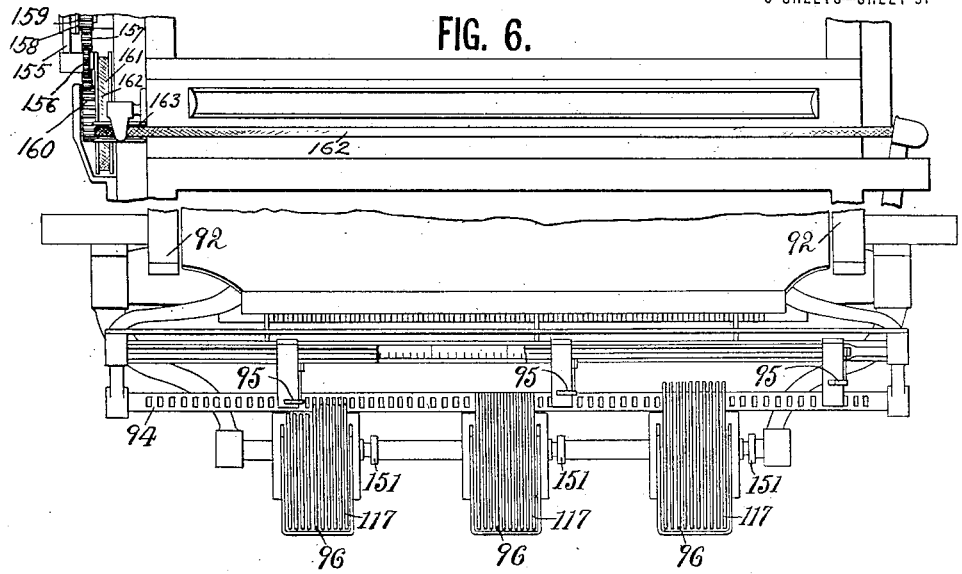
Fig. 6 is a plan view of the rear portion of the typewriter carriage, and also showing three groups of jacks forming portions of the three groups of computing mechanism.
Figure 7:
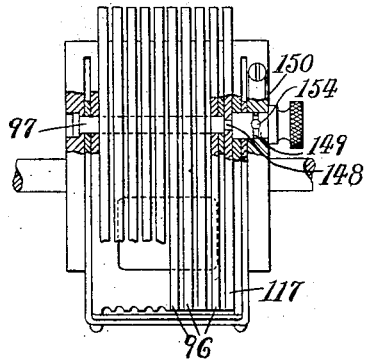
Fig. 7 is a plan of a set of jacks, showing particularly the means for silencing the supernumerary jack when required.

At Fig. 6 are shown in plan three groups of jacks 96 and three tappets 95, one for each of said groups; these tappets being independently adjustable along the rack bar 94 on said paper carriage 92. It will be understood from this that the general operator 13 will be actuated each time that a key 88 is operated to calculate a number in the units place, in any of the three groups of computing mechanism; said general operator 13 being therefore actuated three times during each line of writing, assuming that three columns are being written at the same time upon the work sheet.

Provision is made for silencing any one or more of the jacks 117 at Fig. 6, as will be understood by reference to Figs. 7 to 10. Each supernumerary jack 117 is pivoted upon a pin 148, which is formed eccentrically upon a stub-shaft 149, which is journaled in the jack frame 150 in line at Fig. 7 with the pivot 97 of the denomination jacks 96. Upon each stub-shaft is provided a button 151, whereby the pivot 146 may be rotated from its normal depressed position at Fig. 8 to its elevated position at Fig. 10, the jacks 117 in the former case being held down in working position, and in the latter case being held up clear of the tappets 95, so that the actuation of the general operator 13 will not occur. The buttons are independently movable, so that the operator may have such jacks 117 in or out of use as he may desire. Each stub-shaft 149 may be held in either of its Fig. 8 and 10 positions by means of a spring 152 and detent pin 153, the latter engaging a depression 154 in the stub-shaft.

In Figs. 1ª and 1ᵇ, I illustrate the mechanism for controlling the amount of return movement given to the carriage. The shaft 116ᶜ extends through the right end of the frame, and carries a rigid arm 155, and this arm carries a loose pinion 156, which rolls freely on a gear wheel 157, which is loosely mounted on the shaft. In the returning movement the arm 155 swings in the direction of the arrow in Fig. 1ᵇ, and the pinion 156 rotates idly on the gear 157, without rotating it. But in the path of the pinion 156, there is an interponent pinion 158, which is loosely carried on an interponent arm 159, which may be set in any position on the gear wheel; the teeth of the pinion 158 meshing with the teeth of the gear 157. As the arm 155 swings around, the pinion 156 comes into contact with the pinion 158, and their teeth lock into each other, and lock themselves to the gear 157, so that after this engagement, the gear 157 will be rotated. This locking effect will be evident from the fact that when the pinions mesh together, the tendency of the further movement of the arm 155 is to rotate the pinions in opposite directions, and this, of course, locks them to the gear.

The rotation of the gear 157 is imparted through a pinion 160 to a pulley 161, around which the returning band 162 passes; and from this point the returning band passes up over a suitable guide pulley 163, beyond which it is attached to the carriage. While the band 162 may be attached to any suitable point in the carriage, it is preferably attached to the line-space lever 166, so that the platen will be spaced up as usual for a new line at the same time that the carriage is returned. It will be evident that the only effective part of the movement of the arm 155 in returning the carriage, is that which takes place after it "picks up" the interponent arm 159, and by adjusting the interponent arm to any position desired, any amount of return movement may be given to the carriage.

Figure 8:
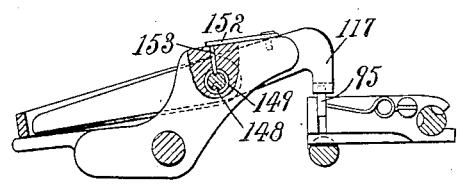
Fig. 8 is a sectional elevation of a supernumerary jack, showing it in normal position.
Figure 9:
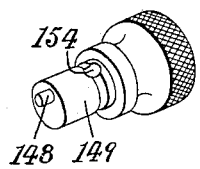
Fig. 9 is a perspective view of a button having an eccentric on which a supernumerary jack is pivoted, and whereby the latter may be swung up to silence it when required.
Figure 10:
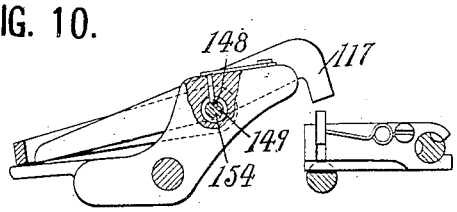
Fig. 10 is a view similar to Fig. 8, but showing the supernumerary jack as silenced.

It will be seen that when the parts are in the Fig. 8 position, the carriage will be returned and the operator automatically actuated at the completion of the writing of the number on the work sheet; but at any time any of the buttons 151 at Fig. 6 may be turned to set the jack or jacks 117 to the idle position seen at Fig. 10, and at the completion of the writing of the numbers in these columns, the carriage will not be returned automatically nor will the computing machine actuator be operated.

By reason of the fact that provision is made for returning the carriage concomitantly with the computing operation, it is evident that in the structure disclosed, the jacks 117 have the function of carriage-returning members as well as that of computation-controlling members.

Variations may be resorted to within the scope of the invention, and portions of the improvements may be used without others.

Having thus described my invention, I claim:

1. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of means connected to a source of power for actuating said operator, and automatic means dependent upon a movement of the typewriter carriage for enabling said actuating means to operate, and for returning said carriage to begin a new line.

2. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing device, and an operator for moving the computing devices, of means connected to a source of power for actuating said operator, and automatic means dependent upon a movement of the typewriter carriage with relation to the units column or position for enabling said actuating means to operate, and for returning said carriage to begin the writing of a new line.

3. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of means connected to a source of power for actuating said operator, and means operable by any of said keys and dependent upon a movement of the typewriter carriage for enabling said actuating means to operate and said carriage to return to begin a new line.

4. In a computing machine, the combination with printing devices, a letter-feeding carriage and computing devices, of an operator for moving the computing devices, and means dependent upon the writing of a character in the units place for causing said operator to be actuated, and for returning said carriage to begin a new line.

5. The combination with a typewriter carriage and numeral keys to control the same, of computing devices, blocks abjustable along the carriage to select the columns in which the keys connect with the computing devices, an operator for the computing devices, and means coöperating with said blocks to enable the keys, when writing in the units place in any column, to effect a movement of said operator and return said carriage.

6. In a typwriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of an electrical motor, and means connected to the typewriting mechanism for enabling said motor to actuate said operator and return said carriage upon the writing of a number in the units place.

7. The combination of a typewriter carriage, carriage-feeding numeral keys, computing devices of different denominations settable by said keys, a general operator for said computing devices, a set of jacks, a cam or device on said carriage to move said jacks successively for determining the denomination of the computing device to be set by said keys, a supernumerary jack also operable by said cam at the next movement thereof after the units jack is operated, and means controlled by said supernumerary jack for actuating said operator, and returning said carriage.

8. In a typewriting and computing machine, the combination of a typewriter carriage, type-operating numeral keys having means for feeding said carriage, a plurality of computing heads, each having devices set table by said keys in coöperation with said carriage, whereby computation may be effected in a plurality of columns, a common operator for said computing heads, means connected to a source of power for actuating said common operator, and automatic means dependent upon a movement of the typewriter carriage upon computation in the last of said columns, for causing said actuating means to operate and said carriage to return to begin a new line.

9. In a typewriter and computing machine, the combination of a typewriter carriage, type-operating numeral keys having means for feeding said carriage, a plurality of groups of computing mechanism each including devices settable by said keys in coöperation with said carriage, whereby computation may be effected in a plurality of columns, an operator common to said groups of computing mechanism, a motor, and means dependent upon a movement of the typewriter carriage relatively to the units place in the last column, for connecting said motor to said operator to actuate the latter, and return said carriage to begin a new line.

10. The combination with type-operating numeral keys and a typewriter carriage controlled thereby, of a series of groups of computing mechanism whereby computation may be effected of the numbers in a plurality of columns written on the work sheet, each group including computing devices settable by said keys in the order of their denominations beginning with the highest, operating means for said groups, a source of power having normally ineffective means for actuating said operating means, and automatic means dependent upon the writing of a number in the units place in the last of said groups of computing mechanism, for causing said operating means to be actuated by said source of power, and said carriage to be returned to begin a new line of writing.

11. The combination of a typewriter carriage, carriage-feeding numeral keys, computing devices of different denominations settable by said keys, a general operator for said computing devices, a set of jacks, a cam or device on said carriage to move said jacks successively for determining the denomination of the computing device to be set by said keys, a supernumerary jack also operable by said cam at the next movement thereof after the units jack is operated, means controlled by said supernumerary jack for actuating said operator and returning said carriage to begin a new line, and means for silencing said supernumerary jack at will.

12. In a typewriting and computing machine, the combination of a typewriter carriage, type-operating numeral keys having means for feeding said carriage, a plurality of groups of computing mechanism, each including devices settable by said keys in cooperation with said carriage, whereby computation may be effected in a plurality of columns, normally ineffective means connected to a source of power for operating the computing devices set by the keys, and for returning said carriage, a series of independently operable jacks or devices, each connected to means for causing said operating means to become effective, means to enable said carriage to operate said jacks successively during the writing of a single line, and means for silencing any of said jacks at will.

13. The combination with a typewriting mechanism including a carriage and numeral keys, of a computing mechanism to register a number comprising a series of digits concomitantly with the writing of said number by said typewriting mechanism at the striking of said numeral keys, and means operative at the striking of the final digit in said number for concomitantly returning said carriage and running up the registered number in said computing mechanism.

14. The combination with a typewriting mechanism including type-operating keys, and a carriage for determining the printing point of said types, of a computing mechanism including an item register, a general operator, and carriage-controlled means for enabling the concomitant actuation of said general operator and the return of said carriage to select a new printing point.

15. In a combined typewriting and computing machine, the combination with a carriage and a platen, of computing mechanism, numeral keys for writing on said platen in predetermined columns, means for controlling said computing mechanism as said numeral keys are struck, and means actuated at the striking of a numeral key to write a digit in any units column, to return said carriage.

16. In a combined typewriting and computing machine, the combination with typeoperating numeral keys, and a typewriter carriage for determining the printing point of said types, of computing devices effective at a point selected by said carriage, carriage-controlled means for automatically returning said carriage to select a new printing point, and means settable to make said carriage control ineffective.

17. In a combined typewriting and computing machine, the combination with typeoperating numeral keys, and a traveling typewriter carriage for determining the printing point of said types, of carriage-controlled means operated at predetermined points in the movement of said carriage for automatically returning said carriage, means for computing at said points, and means settable to make said carriage control ineffective at each point.

18. In a combined typewriting and computing machine, the combination with a carriage and printing mechanism relatively movable, of means to enable the printing of two columns, either adjacent or non-adjacent, at different positions of a work-sheet, computing mechanism, and means for causing actuation of said computing mechanism and return of the carriage automatically when printing a complete number in a third column, said carriage returning to the beginning of any column at will.

19. In a computing machine, the combination with computing mechanism, of denominational selecting means for said computing mechanism, a traveling carriage controlling the printing upon a work-sheet of the computed numbers, and means controlled from said denominational selecting means for returning said carriage to begin a new line of writing.

20. In a computing machine, the combination with computing mechanism, of a traveling carriage for determining denominational selection of said computing mechanism in different computing zones, means for controlling the return of said carriage from any computing zone, and means for rendering the returning means ineffective in any zone, at will, whereby a denominational selection may take place in a plurality of zones, while said carriage is returned from a selected zone only.

21. In a combined typewriting and computing machine, the combination with a traveling carriage, of means for printing numbers in a column located at sundry places on a work-sheet carried by the carriage, computing mechanism, and means for causing the numbers to be computed and the carriage to be returned automatically to the beginning of the column on printing the complete number in said column.

22. In a computing machine, the combination with a traveling carriage for determining the various computing zones, of computing mechanism operable in different zones as determined by said carriage, a computation-determining and carriage-returning member for each zone, and means for returning the carriage from any one of said members.

23. In a combined typewriting and computing machine, the combination with a traveling carriage having step-by-step movement, of computing mechanism, and means controlled by the carriage in its step-by-step movement for causing computation in said computing mechanism and the return of said carriage.

24. In a computing machine, the combination with numeral keys and a traveling carriage, of a plurality of gangs of computing wheels, an item register for each gang in which a number is temporarily registered, a general operator for carrying the number so registered in each register into the computing wheels, automatic means settable to cause said general operator to be operated and said traveling carriage to be returned whenever a number is completely registered in said registers, and means for varying at will the distance the carriage is returned.

25. In a computing machine, the combination with numeral keys and a traveling carriage, of a plurality of gangs of computing wheels, an item register for each gang in which a number is temporarily registered, a general operator for carrying the number so registered in each register into the computing wheels, and means settable to cause said general operator to be operated and said traveling carriage returned whenever a number is completely registered in said registers; said means settable to be ineffective with respect to any one of said registers.

26. In a combined typewriting and computing machine, the combination with a traveling carriage and a plurality of item registers, of a gang of computing wheels for each item register, means for setting up numbers on said item registers by the numeral keys of the typewriter, a general operator for carrying numbers so registered into the computing wheels, and means settable for causing the complete registering of a number in any one of said registers, to automatically return said carriage and operate said general operator.

27. In a combined typewriting and computing machine, the combination with numeral keys and a traveling carriage, of a plurality of item registers, a gang of computing wheels for each item register, means for setting up numbers on said item registers by the numeral keys of the typewriter, a general operator for carrying a number so registered in each item register into its computing wheels, means controlled by the carriage for determining in what denomination the numeral keys of the typewriter shall register a number written, a source of power, and means controlled by said carriage whenever a number is written in the units denomination for connecting said source of power to operate said general operator and return said carriage.

28. In a computing machine, the combination with numeral keys and a traveling carriage, of a plurality of item registers, a gang of computing wheels for each item register, a general operator for carrying numbers registered in said registers into said computing wheels, a source of power for returning said carriage and driving said general operator, and means selectively settable for each item register for causing said source of power to operate said item register and return said carriage.

29. In a computing machine, the combination with numeral keys and a traveling carriage, of a plurality of item registers, a gang of computing wheels for each item register, a general operator for carrying numbers registered in said registers into said computing wheels, a source of power for returning said carriage and driving said general operator, means selectively settable for each item for causing said source of power to operate said item register and return said carriage, and means settable to determine the extent to which said carriage shall be returned.

30. In a combined typewriting and computing machine, the combination with numeral keys and computing wheels, of a general operator for turning said wheels to an extent determined by said keys, a traveling carriage, a source of power, means for connecting said operator to said source of power to give said general operator a single actuation, and means controlled by said carriage for automatically controlling said connecting means.

31. The combination with a traveling carriage, of computing mechanism, key-actuated means for concomitantly registering numbers digit by digit in said computing mechanism and advancing said carriage step by step, controlling means for said computing mechanism operable from said carriage during the advancing movement of said carriage, said controlling means being arranged in sets or groups corresponding to different computing zones or columns, carriage-returning means, operating means for said computing mechanism, an automatic governing set individual to each group of said controlling means, coming into play at the end of a computing zone or column, to concomitantly effect an actuation of said operating means and an actuation of said carriage-returning means, said automatic governing sets being individually silenceable, and adjusting means for varying the extent of effectiveness of said carriage-returning means to correspond with the particular governing set effective.

32. The combination with a typewriting mechanism including a carriage, of a computing mechanism, a series of members carried by said carriage for according the denominations of the digits computed in and by said computing mechanism with the denominational columns of the digits printed by said typewriting mechanism, and means for selectively enabling one of said members to control a driving movement of said carriage.

33. The combination with a typewriting mechanism including a traveling carriage, of a computing mechanism, a series of members for according the denominations of the digits computed in and by said computing mechanism with the denominational columns of the digits printed by said typewriting mechanism, and means to enable the member at the end of the series to effect a return movement of said carriage after a complete line of numbers has been written and accumulated in the computing mechanism.

34. The combination with a typewriting mechanism including a carriage, of computing mechanism including a general operator, carriage-carried means for according the denominations of digits computed in and by said computing mechanism with the denominational columns of the same digits written by said typewriting mechanism, and automatic means actuated by said carriage-carried means for concomitantly returning said carriage and actuating said general operator to run up a number set up in said computing mechanism.

35. The combination with a carriage, carriage-returning means, and a general computing operator, of a tappet on the carriage, and means coöperative with said tappet to determine the actuation of the general operator and the return movement of the carriage, said tappet being adjustable with relation to said carriage to vary the point in the run of the carriage at which such coöperation takes place.

36. In a combined typewriting and computing machine, the combination with a traveling carriage, of computing mechanism, numeral keys for controlling the printing and indexing of numbers, and means controlled from said carriage when a number has been completely printed and indexed for running said number into the computing mechanism and returning said carriage to begin a new line.

37. In a computing machine, the combination with computing devices, of printing devices for printing on a work-sheet numbers in different columns which are carried into the computing devices, a carriage controlling columnar computation and printing, and means dependent upon the operation of the computing devices in different columns for returning the carriage.

38. In a computing machine, the combination with computing devices, of printing devices for printing on a work-sheet numbers in different columns which are carried into the computing devices, a carriage controlling columnar computation and printing, and adjustable means for determining the columnar computing and the return of the carriage.

39. In a computing machine, the combination with computing mechanism, of a traveling carriage for determining the denominational orders of computation, and mechanism set into operation automatically when determining the units order of computation for returning said carriage.

40. In a computing machine, the combination with computing mechanism, of a traveling carriage for determining the denominational orders of computation, a motor adapted to return said carriage, and means brought into action automatically when determining the units order of computation for rendering said motor effective to return said carriage.

41. In a combined typewriting and computing machine, the combination with a plurality of registers, of preliminary representation or indexing devices for said registers, a traveling carriage, a general operator for running into the registers the numbers indexed, and means adjustable along said carriage to cause said general operator to actuate a plurality of said registers simultaneously to compute the same individual item set up on said representation devices, and to cause the return of the carriage to begin a new line.

42. In a computing machine, the combination with a plurality of registers and register-actuating mechanism including denominational selecting dogs and coöperating groups of denominational determining members, one selector dog and one group of members for each register, of a carriage-returning member also coöperating with said selector dogs, the construction and arrangement being such that each selector dog is operative upon its own set of denominational members and its corresponding carriage-returning member, but inoperative upon the remaining denominational members and remaining carriage-returning members.

43. The combination with a plurality of registers, of denominational selecting mechanism for said registers including coöperating jacks and tappets of different ranges for controlling the activity of the various registers, a carriage, carriage-returning jacks, and means for enabling said tappets to control the return of said carriage, said means being rendered active through the medium of said carriage-returning jacks.

44. In a combined typewriting and computing machine, the combination with a plurality of registers, of denominational members individual to each register, denominational selecting dogs individual to each set of denominational members, means for rendering any selector dog active to control the denominational selection of its corresponding denominational members, and means for returning the carriage automatically under the control of any active denominational selector dog.

45. In a combined typewriting and computing machine, the combination with a traveling carriage, of means for printing numbers in two or more columns at different places on a work-sheet carried by the carriage, computing mechanism, and means for causing the numbers to be computed and the carriage to be returned automatically to the beginning of the first column on printing the complete number in the last column.

46. In a combined typewriting and computing machine, the combination with a carriage and printing mechanism relatively movable, of means for printing numbers in two or more columns at sundry positions on a work-sheet carried by the carriage, computing mechanism, and means for causing the numbers printed in two non-adjacent columns to be computed and the carriage to be returned automatically to the beginning of a predetermined column on printing the complete number in the last column in which computing is done.

47. In a combined typewriting and computing machine, the combination with a carriage and printing mechanism relatively movable to enable a column of numbers to be printed at different places on a work-sheet, of a plurality of registers, and means acting automatically when printing the last digit of any number to enable the numbers printed in said column to be carried into a plurality of said registers simultaneously and the return of said carriage to the beginning of the printed column.

48. In a combined typewriting and computing machine, the combination with a typewriter carriage, of numeral keys, computing devices controlled thereby, a set of jacks, a device on said carriage to move said jacks successively for determining the denomination of the computing devices to be controlled by said keys, a supernumerary jack also operable by said device at the next movement thereof after the units jack is operated, and means controlled by said supernumerary jack for returning said carriage.

FREDERICK A. HART.

Witnesses:
  PAUL ZIRON,
  F. D. AMMEN.